June 20, 1967     J. C. MARTIN ETAL     3,327,094
SELF-CLEANING ELECTRIC COOKING APPARATUS
Filed Aug. 24, 1964     6 Sheets-Sheet 1

INVENTORS
John C. Martin
Donald F. Alexander
BY
Frederick M. Ritchie
THEIR ATTORNEY

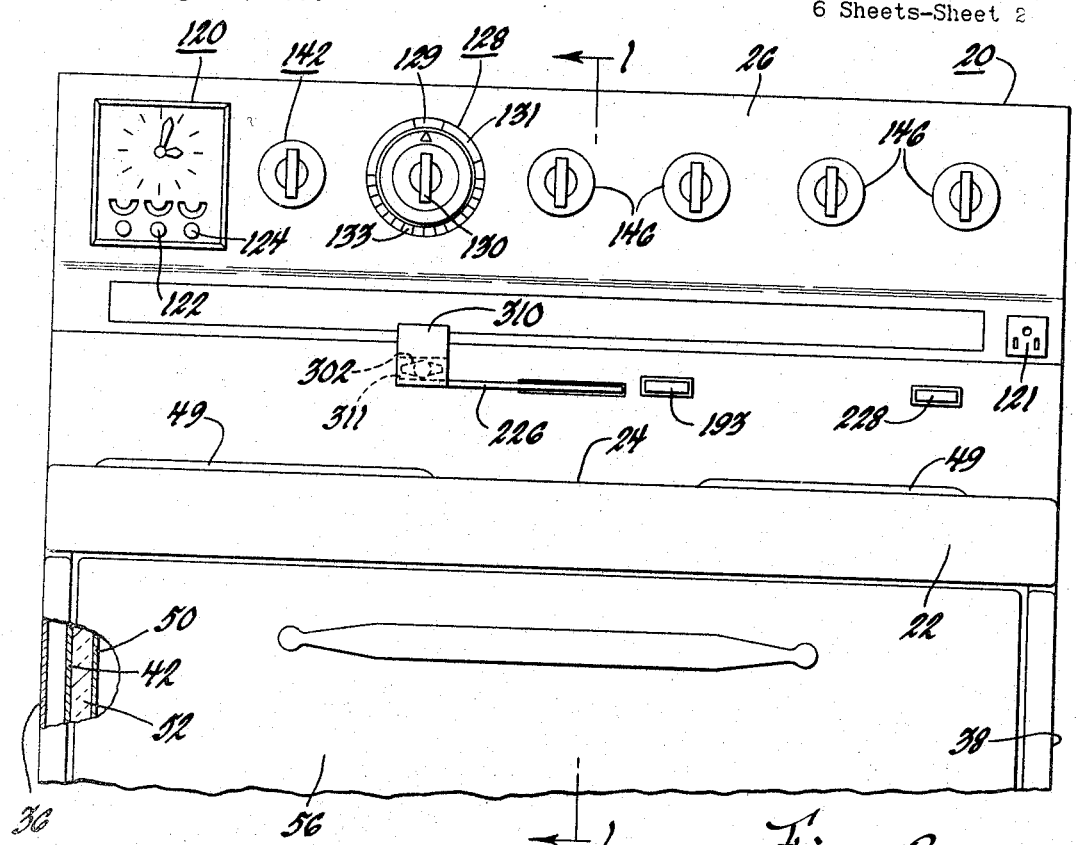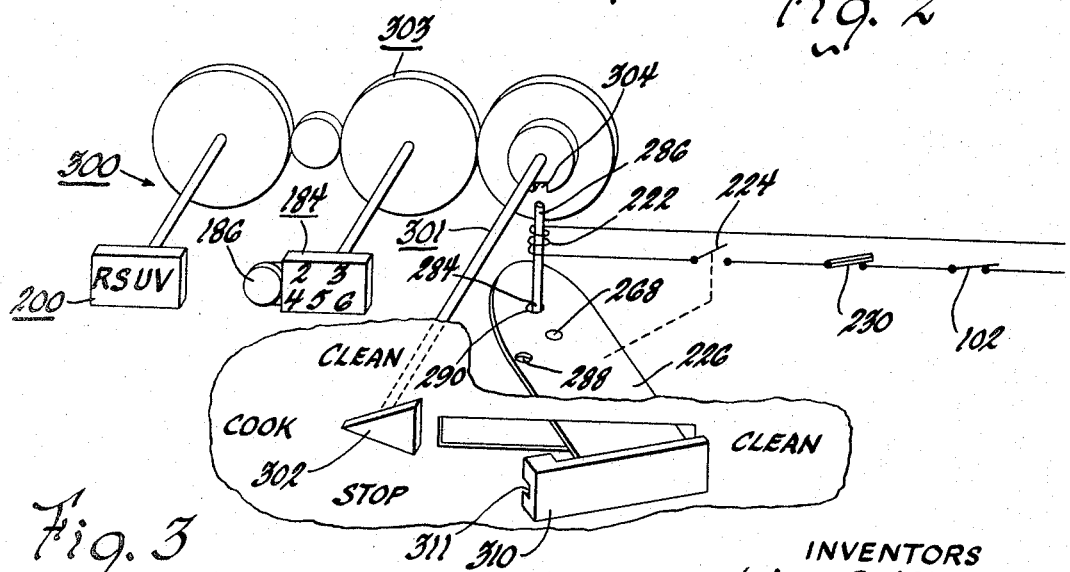

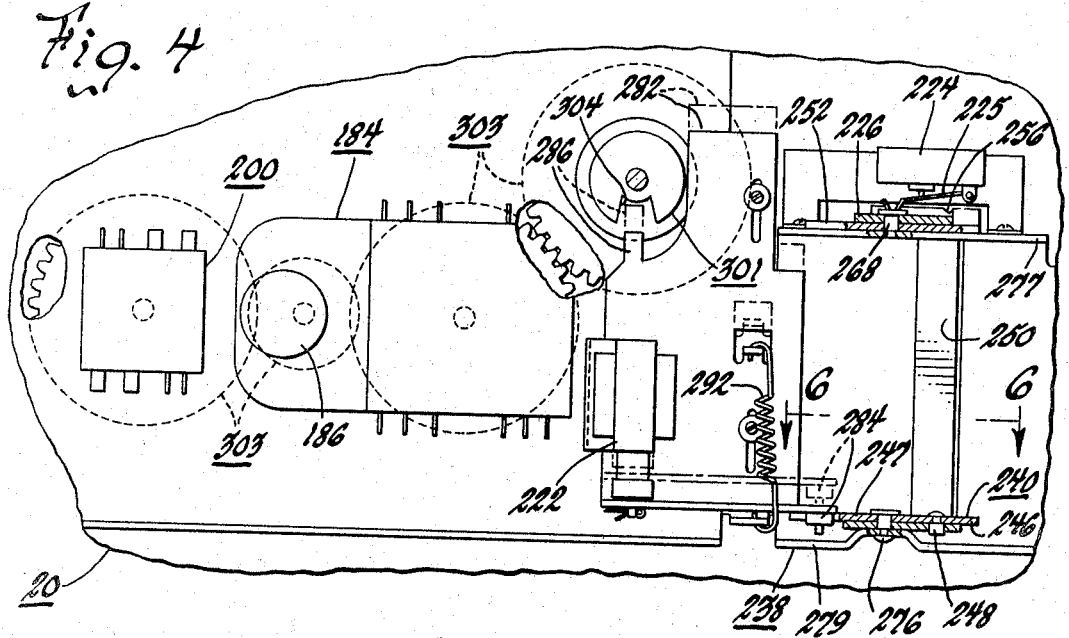
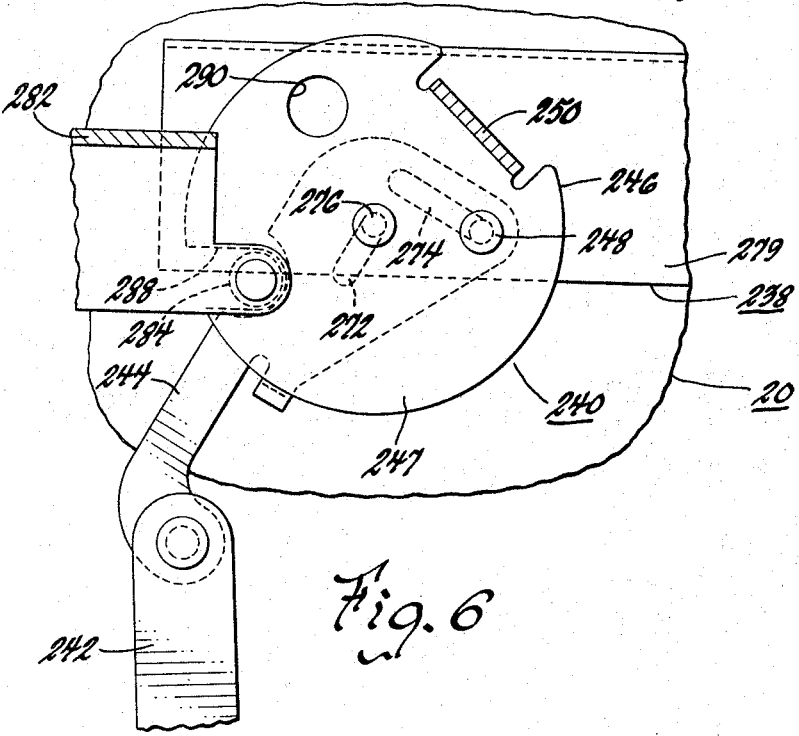

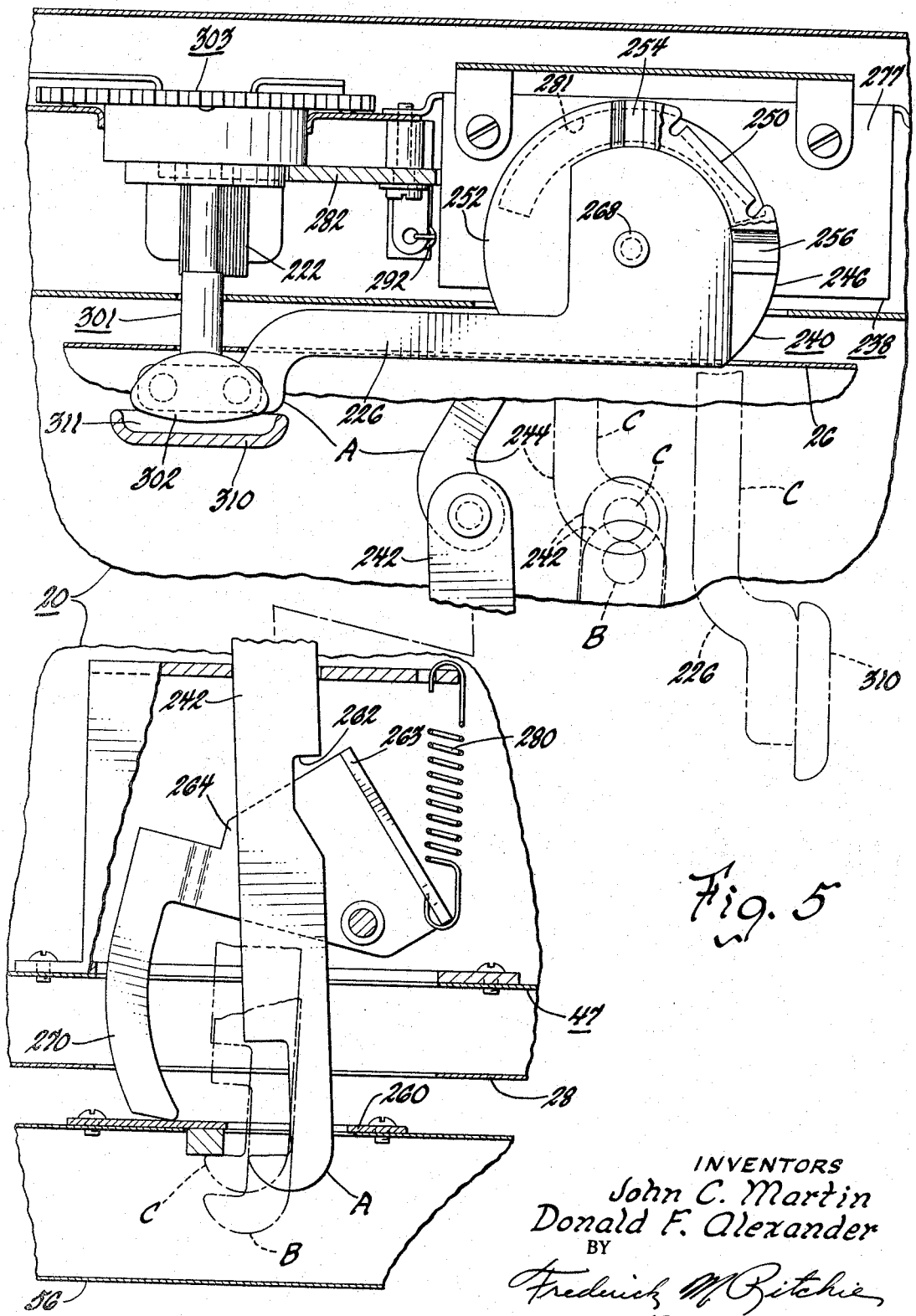

INVENTORS
John C. Martin
Donald F. Alexander
BY Frederick M. Ritchie
THEIR ATTORNEY

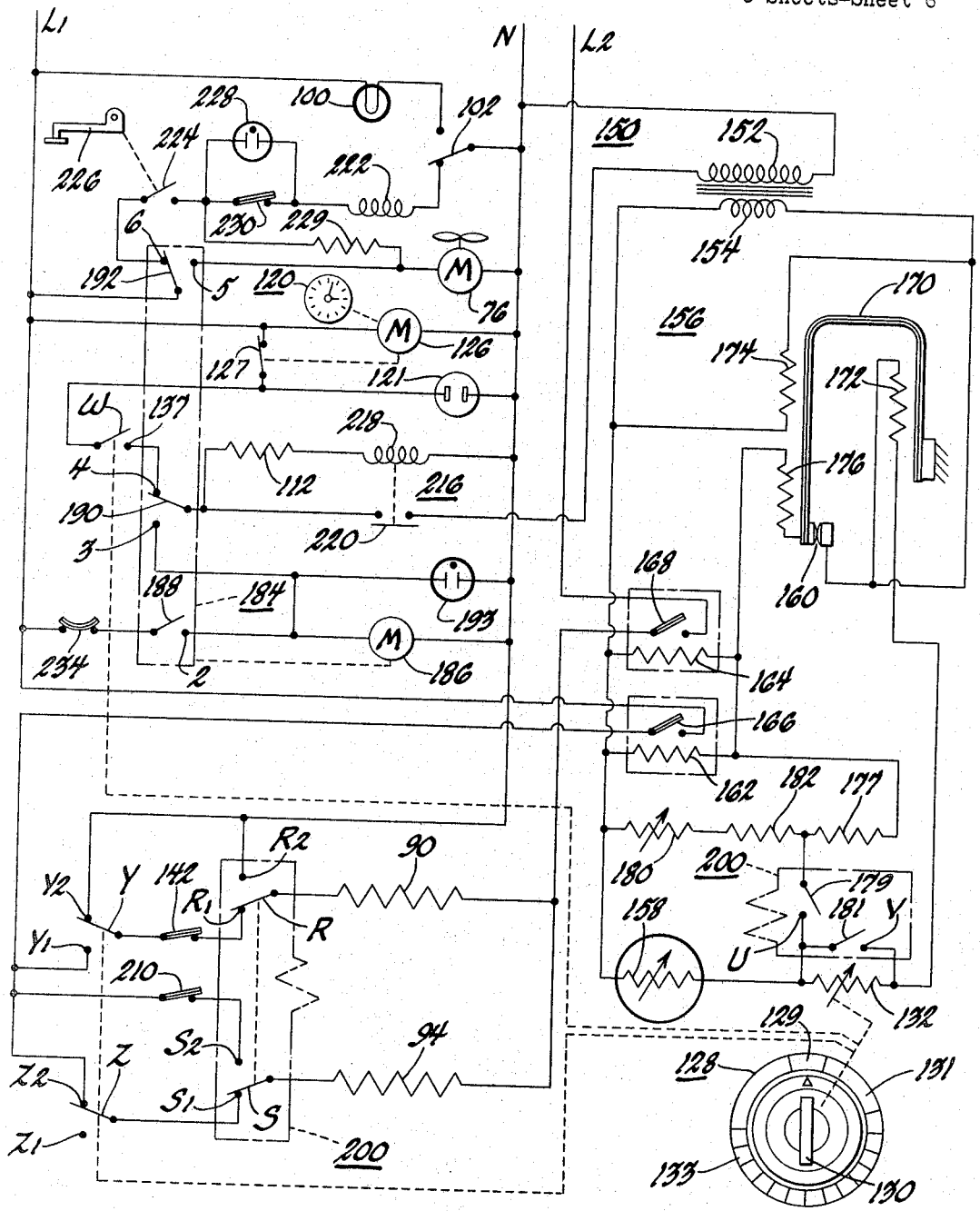

United States Patent Office 3,327,094
Patented June 20, 1967

3,327,094
SELF-CLEANING ELECTRIC COOKING
APPARATUS
John C. Martin, Kettering, and Donald F. Alexander,
Dayton, Ohio, assignors to General Motors Corporation, Detroit, Mich., a corporation of Delaware
Filed Aug. 24, 1964, Ser. No. 391,559
20 Claims. (Cl. 219—393)

This invention relates to an improved temperature control system for a self-cleaning oven and more particularly to an electrical thermostatic control system having a user settable thermostatic control means for obtaining a normal range of temperatures in the oven and a separate manually settable control means for disconnecting or shunting out the user settable thermostatic control means and for shifting the point of control from the normal range of temperatures for cooking to a higher temperature range for cleaning.

This invention also relates to features of the temperature control system effecting the safe operation thereof and finds utility in a self-cleaning oven where the oven is operated at either normal cooking temperatures between about 150° F. and 500° F. or at a higher temperature generally above 800° F., such as 880° F., for burning off food soil and grease spatter that accumulate on the walls of the oven liner during the cooking of food in the oven.

More particularly, the temperature control system of this invention is provided for a self-cleaning oven of the type taught in the patent to Ames 2,224,945, issued Dec. 17, 1940, and is an improvement over the patents to Welch 3,094,605 and 3,122,626, issued June 18, 1963, and Feb. 25, 1964, respectively, on an oven temperature control system for a self-cleaning oven.

This invention contemplates the provision of an electrical thermostatic control system having a variable-resistance temperature sensor of the type disclosed in the patents to Baker 2,962,575, issued Nov. 29, 1960, and Hanssen 3,069,524, issued Dec. 18, 1962. Such a prior art system is suitable for providing a low temperature range for oven cooking and a higher temperature range for oven cleaning.

Accordingly, it is an object of this invention to provide an oven temperature control system for a self-cleaning oven which includes a factory presettable thermostat means for predetermining cleaning temperature, a user settable thermostat means for regulating the oven cooking temperatures and means for shunting out the user settable means during an oven cleaning cycle.

Another object of this invention is the provision of a mechanical and visual interlock system for preventing the conditioning of the oven for a high temperature cleaning operation until after the oven door is closed and locked shut.

A further object of this invention is the provision of an oven temperature control system for a self-cleaning oven which includes a cooking timer for regulating the duration of oven cooking operations and a clean timer operable for regulating the duration of oven cleaning operations.

A still further object of this invention is the provision of an oven temperature control system including one timing means and temperature setting means for an oven cooking operation and another separate and independent timing means and temperature setting means for an oven cleaning operation.

Further objects and advantages of the present invention will be apparent from the following description, reference being had to the accompanying drawings wherein a preferred embodiment of the present invention is clearly shown.

In the drawings:

FIGURE 2 is a fragmentary front elevational view of the electric range in FIGURE 1;

FIGURE 3 is a schematic representation of the control arrangement for the self-cleaning oven of this invention;

FIGURE 4 is a fragmentary front sectional view of the control arrangement, partly in elevation, taken along line 4—4 in FIGURE 1 to illustrate a mechanical interlock of the cleaning cycle with the oven door latch;

FIGURE 5 is a fragmentary top sectional view of the control arrangement, partly in elevation, taken along line 5—5 in FIGURE 1 to illustrate the oven door latch;

FIGURE 6 is a sectional view taken along line 6—6 in FIGURE 4.

FIGURE 9 is a schematic wiring diagram embodying the control arrangement of this invention.

Figure 1:
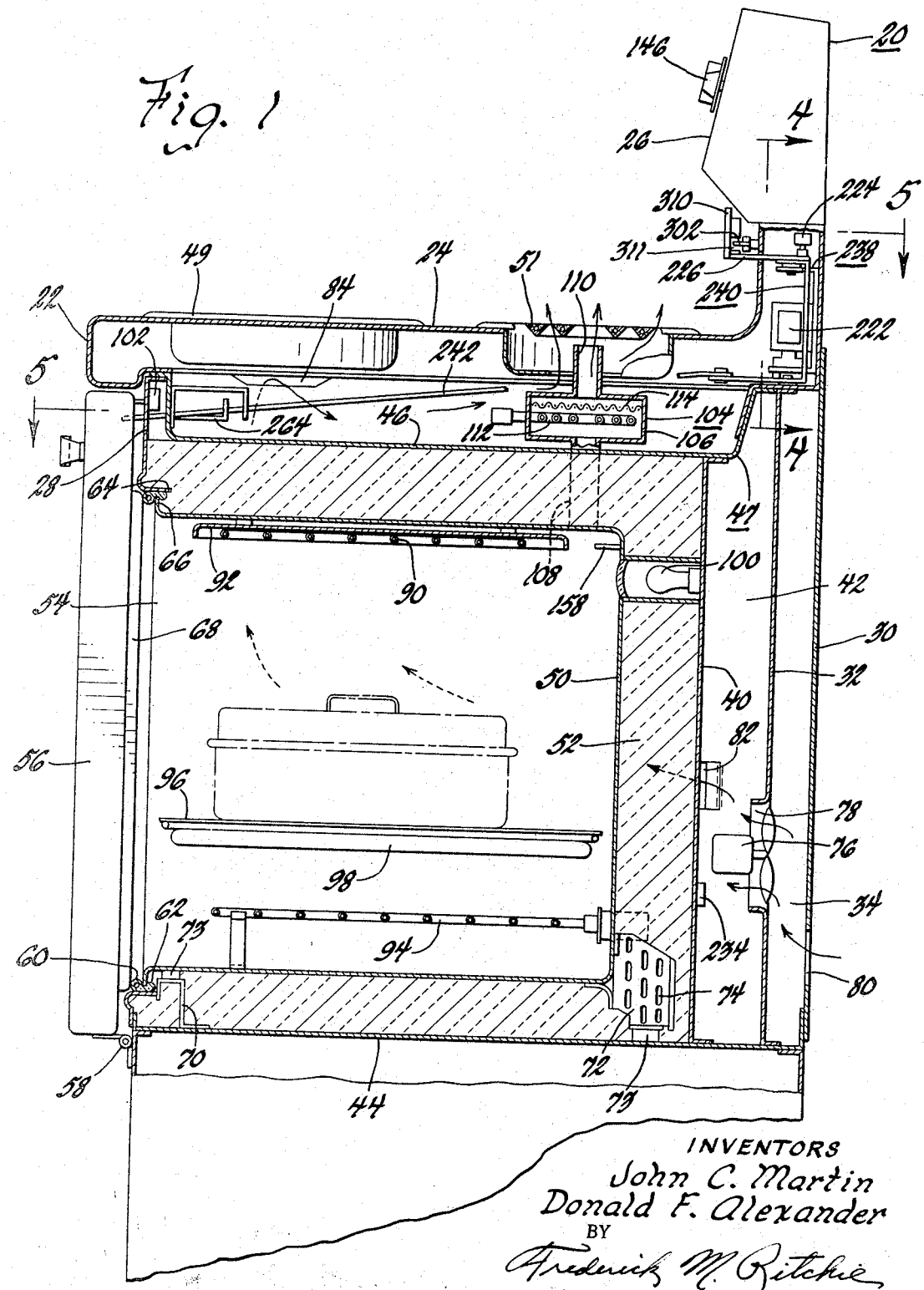
FIGURE 1 is a fragmentary side sectional view taken along line 1—1 in FIGURE 2 and with parts broken away to show an electric range having the self-cleaning oven of this invention.

Referring now to FIGURES 1 and 2 of the drawings, an electric range 20 suitable for use with the improved control arrangement of this invention is illustrated. More particularly, the range 20 is comprised of an upstanding substantially boxlike metal body 22 having a substantially horizontal metal cooking top 24 and an upstanding control console or backsplash 26 at the rear of the cooking top 24. The body 22 constitutes a shell or range casing and includes a front wall 28, an outer rear wall or electric wire cover 30, an inner rear wall 32 spaced forwardly of the rear wall 30 to form an inlet air passageway 34, and a pair of outer sidewalls 36, 38. Spaced inwardly from the rear wall 32 and the sidewalls 36, 38 are insulation retainer means comprised of a back retainer wall 40, side retainer walls, such as 42, on each side thereof and spaced inwardly from the range sidewalls 36, 38, a bottom wall or support partition 44 and a top wall 46 which is also the bottom of a pan-like subtop member 47 carried by the range casing 22 for formnig a compartment beneath the cooking top 24.

An oven forming liner 50 having a one-coat acid resistant porcelain finish is positioned within the insulation retainer and spaced from the walls thereof to form a chamber for insulation 52 which completely envelops the oven liner 50 except for the front opening 54 thereof which is closable by an oven door 56 hingedly mounted at 58 for opening and closing the oven liner to gain access thereto. It has been found that too much air during an oven cleaning cycle causes peculiar hissing or "whooshing" sounds, such as would be made by an outgoing rush of smoke or effluent from the oven, when the soil load is heavy. For this reason a Fiberglas seal 60 completely circumscribes the opening 54 of the oven liner and includes an attachment portion 62 sandwiched between a flange 64 of the front wall 28 of the range casing and the flange 66 of the oven liner to minimize heat conduction therebetween. The front of the seal 60 abuts the pluglike inner panel portion 68 of the door 56 to seal the heat and other products of the heat cleaning process in the oven. The oven liner 50 is mounted at the bottom thereof on the support partition 44 by means on each side of the liner, such as brackets 70, 72, the rear ones of which include a plurality of slots 74 for minimizing heat conduction between the liner 50 and its support wall 44. Ceramic spacers 73 also serve to minimize heat flow.

Forced air cooling of the surfaces between the insulation retainer walls and the back, side and top walls of the range is provided by a blower means 76 disposed in an opening 78 of the inner rear wall 32, the blower operating to draw outside air into the range through the opening 80 in the outer rear wall 30. The air thus drawn into the range is forced through lanced out openings 82 in each of the sidewall insulation retainers 42—this air, after filling the space between the side insulation retainers 42 and the outer range walls 36, 38, entering the space beneath the cooking top 24 through openings, such as the notch 84, formed in the top edge of the subtop 47. The cooking unit openings 49 around the surface cooking units 51 provide the means for exhausting the cooling air from the range.

Heating within the oven liner 50 is provided by a broil heating element 90 carried in a reflector 92 at the top of the oven and by a bake heating element 94 at the bottom of the oven. Removable shelves, such as 96, are slidably positioned on embossments 98 on opposite sides of the oven liner. Illumination of the oven liner when the oven door 56 is opened is provided by a lamp 100 interconnected with a power supply through a door switch 102.

To accommodate the smoke and products of combustion from either an oven cooking operation or an oven cleaning operation, a catalytic oxidizing unit 104 is positioned to receive the exhaust from the oven 50. More particularly, the catalytic oxidizing unit 104 is comprised of a housing 106 having an inlet duct 108 in communication with the oven 50 and an outlet duct 110 in communication with the atmosphere through one of the cooking unit openings 49. Between the ducts 108 and 110 is the chamber 106 enclosing a catalyst heater 112 and a catalyst screen 114. The heating element or catalyst heater 112 is energized to activate the catalyst screen 114 whenever it is desired to eliminate smoke and other noxious products issuing from the oven.

User control means are provided for the various functions of the electric range 20. Turning specifically to FIGURE 2, the control panel 26 is shown comprised of an electric clock timing means or automatic oven control 120 presettable to regulate the duration of an oven cooking operation, such as baking, by a knob 122 to determine the hours to cook and by a knob 124 to determine the time at which the oven cooking operation is to stop. The oven control 120 may be of the type used on the assignee's Frigidaire ranges under the name "Cook-Master." In general and with reference to the wiring circuit on FIGURE 9, the clock timing means 120 includes a motor 126 operably associated with a timer switch 127 for controlling the duration of the baking operation—the switch 127 having a closed position to supply power for use in the baking operation and having an open position to terminate the supply of power to stop the baking operation. A plug-in appliance receptacle 121 may also be controlled through the timer switch 127.

Other controls for the range 20 include an oven cooking thermostat 128 having a user settable thermostat knob 130 positionable to an OFF position 129, a BROIL position 131 and a variable bake temperature position 133. Manipulation of the knob 130 in the variable temperature position 133 will adjust a variable resistance or rheostat 132 in the wiring circuit in accordance with the temperature selected and position selector switches W, Y and Z on the bake contacts 137, $Y_2$ and $Z_2$, respectively. With the knob 130 in the BROIL position 129, switches Y and Z are moved, respectively, to broil contacts $Y_1$, $Z_1$. W remains closed in all knob positions except OFF. It will be seen that a timed baking operatoin may be predetermined by the clock timing means 120, when the knob 130 is in the variable temperature position, since the clock switch 128 and the selector switch W are then in series.

The broiling operation of the range 20 may be regulated with an additional control 142 which includes an adjustable pulser in series with the broil heating element 90 whenever the user settable thermostat knob 130 is in the broil position. A variable doneness of the meat being broiled is effected by manipulating the control 142 in accordance with the teachings of the Fry Patents 2,790,056 and 2,828,399, issued Apr. 23, 1957, and Mar. 25, 1958, respectively.

The remaining controls 146 on the control panel 26 are devoted to controlling the surface cooking units 51 on the cooking top 24.

We turn now to the control arrangement for a self-cleaning oven and more particularly to the parts relating thereto shown in the schematic wiring diagram of FIGURE 9. Accumulated oven soil must be degraded at a temperature of 750° F. or more to effect a high temperature cleaning process consisting of parital oxidation of the soil in the oven with a restricted air supply. The smoke, carbon monoxide, carbon dioxide and water vapor resulting from the high temperatures in the oven must be contained in the oven chamber by a sealed door. Too much localized inlet air will cause peculiar hissing or "whooshing" sounds, such as would be made by an outgoing rush of smoke or effluent from the oven, under a heavy soil load. Thus, the full door seal 60 included with the oven of this invention prevents air from entering the oven at any one spot around the door; and the restricted air supply necessary for the heat cleaning process is allowed to enter the oven cavity by leakage at various points around the oven liner, such as where the bake and broil heating elements and the oven lamp extend through the liner at their respective terminal ends.

An upper temperature limit of 950° F. in the oven is imposed on the oven control arrangement simply by the temperature limitations of the materials used in the oven, namely the steel oven liner and the porcelain coating thereon. Nevertheless, to assure user satisfaction, the entire inside surface of the oven liner must be heated to at least 800° F. so that all of the oven soil will be burned off—even in the hard to heat crevices of the liner. The general process of heating to a high temperature for burning off oven soil has been taught in the aforementioned Ames patent. Following is an improved control system or arrangement for such a self-cleaning oven to secure improved cleaning results and added safety.

The control system of this invention embodies, in general, a high voltage (118/236 volt) A.C. circuit 150 including the primary coil 152 of a transformer, the secondary coil 154 of which is in a low voltage (11 volt) A.C. circuit 156.

The low voltage circuit 156 includes a wound wire resistance sensor 158 in series with the usual customer operated or user settable oven thermostat rheostat 132. In accordance with the temperatures sensed at 158, a cycler or responder switch 160 opens and closes to pass current to a pair of thermal relays, and more particularly to the heaters 162, 164 therefor which control, respectively, a pair of relay switches 166, 168 in the high voltage circuit 150.

The cycler switch 160 may be comprised of a U-shaped bimetal 170 having a responder heater 172 wrapped around one leg thereof and operative upon heating to cause the cycler switch to move in a closing direction. Wrapped on the other leg are a voltage compensator heater 174 and an anticipator heater 176 which operate upon heating to cause the cycler switch to move in an opening direction. Another resistance 177 in the low voltage circuit cooperates with the heater 176 to give a little more anticipation to the cycler by effecting a few more watts at the heater 176. For a more detailed explanation of a variable resistance temperature sensing system for an oven, reference may be had to the Baker Patent 2,962,575 issued Nov. 29, 1960, which is representative of such a temperature controller commercially available from the King-Seeley Thermos Co.

Turning now to those components related to the oven cleaning cycle and the control arrangement therefor, this invention improves over the prior art in that a predetermined oven temperature high enough for satisfactory cleaning is assured by a second or cleaning temperature control rheostat 180 in addition to the user settable cooking temperature control rheostat 132—the rheostat 132 being made ineffective during cleaning as by shunting or disconnecting thereof. The rheostat 180 is factory adjustable within the range of 850° F. to 950° F. and is preset during the manufacture of the range to provide an oven cleaning temperature of 880° F. As a safety precaution, a fixed resistance 182 is added to prevent an adjustment of the rheostat 180 for temperatures above 950° F.

To initiate a cleaning cycle and to shift the temperature sensing system for providing the higher cleaning temperature of 880° F., a cleaning temperature control contact U is closed by a cleaning temperature control switch 179 to bring the second temperature control rheostat 180 into controlling relationship with the sensor 158. At the same time, a shunt contact V is closed by a cooking temperature shunt switch 181 to shunt the first temperature control rheostat 132 completely out of the cleaning circuit. Since the rheostat 132 is operated by the conventional user settable thermostat knob 130, it can be seen that a user selected position of the oven thermostat 128 during a cleaning cycle has absolutely no effect on the regulation of cleaning temperatures. This improvement over the prior art assures a satisfactory cleaning job every time.

Figure 7:
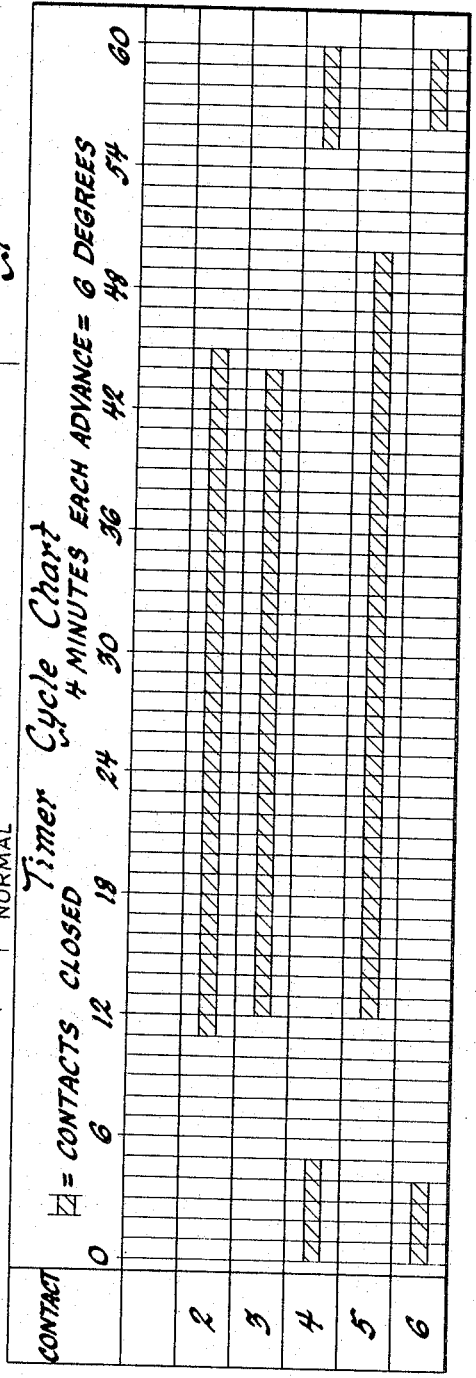
FIGURE 7 is a timer cycle chart illustrating the positioning of internal switches in an oven cleaning timer used with the control arrangement of this invention.

Another improvement in the control arrangement of this invention is the provision of a second timer or timing means 184 in addition to the automatic oven control 120. The timer 184 is comprised of a clean timer motor 186 for operating three cam actuated switches 188, 190 and 192. The clean timer motor switch 188 has an open position at all times except during a cleaning cycle, at which time the switch closes on a clean timer motor contact 2—a neon cleaning cycle ON lamp 193 indicating the operation of the cleaning cycle. The clean timer switch 190 moves between a cleaning cycle contact 3 and a cooking cycle contact 4; and the clean timer switch 192 moves between a cleaning cycle contact 5 and a cooking cycle contact 6. For more detailed information on the positioning of the timer switches 188, 190 and 192 at any given point in the 360° rotation of the timer, reference may be had to the timer cycle chart of FIGURE 7.

Cooperating with the clean timer 184 in a manner to be explained more fully hereinafter is the selector switch assembly 200 including heating element transfer switches R and S in the high voltage circuit and the cleaning temperature control switch 179 and cooking temperature shunt switch 181 in the low voltage circuit. Interconnected transfer switches R and S connect the broil heating element 90 and the bake heating element 94 in a particular manner to the source of power $L_1$, N and $L_2$ depending on whether a COOK operation ("broil" or "bake") (contacts $R_1$, $S_1$) or a CLEAN cycle (contacts $R_2$, $S_2$) is to be effected. More particularly and with the user settable knob 130 in the variable temperature "bake" position 133 (switch Y on contact $Y_2$ and switch Z on contact $Z_2$), switch R on contact $R_1$ connects the broil unit 90 through the oven thermostat switch Y across $L_2$N to 118-volt power and switch S on contact $S_1$ connects the bake unit 94 across $L_1$, $L_2$ to 236-volt power to provide heat energy for the baking function of the COOK operation thermally cycled at 166, 168. Specifically, 3800 watts of heat energy are provided during the "bake" function comprising 3000 watts from the bake unit 94 and 800 watts from the broil unit 90.

With the user settable knob 130 on "broil" position 131 (switch Y on contact $Y_1$ and switch Z on contact $Z_1$), the bake unit 94 is deenergized and switch R on contact $R_1$ connects the broil unit 90 through the oven thermostat switch Y across $L_1$, $L_2$ to 236-volt power to provide heat energy for the broiling function of the COOK operation thermally cycled at 166, 168. During broiling, as aforesaid, the supply of heat energy is further controlled by the pulser 142. Specifically, 3200 watts of heat energy are provided during the "broil" function, all from the broil unit 90 since the bake unit is disconnected at $Z_1$.

For the CLEAN operation, and irrespective of the position of the user settable oven thermostat knob 130, the selector switch assembly 200 is manually operated, as will be more fully explained hereinafter, to position transfer switches R and S on contacts $R_2$ and $S_2$, respectively, and to close cleaning temperature control switch 179 and cooking temperature shunt switch 181. Optionally, rheostat 132 could just as well be made ineffective by disconnecting it at either end thereof when switch 181 closes. Thus, the broil unit is connected directly across $L_2$, N to 118-volt power cycled by the thermal relay switch 168. At the same time the bake unit 94 is connected through a pulser 210 across $L_1$, $L_2$ to 236-volt power cycled on both sides of the line by thermal relay switches 166, 168. With the pulser 210 adjusted for 43% ON time heat energy is thus supplied by broil and bake units to the oven for elevating the temperatures of the oven walls sufficiently to burn off the accumulated oven soil, i.e., to approximately 880° F.

This period at the start of the CLEAN operation during which the oven temperature is elevated to approximately 880° F. is divided into two control sequences. In the first sequence, lasting until the oven temperature reaches approximately 700° F., the thermal relay switches 166, 168 will remain closed continuously and the pulser 210 will interrupt power flow to the bake unit 94 so that the bake unit will be effectively ON only 43% of the time. Specifically, then, during this first control sequence, the broil unit 90 is full ON to provide 800 watts of heat energy and the 3000-watt bake unit 94 is 43% ON to provide effectively 1290 watts of heat energy. At approximately 700° F., the second control sequence commences, when the thermal relay switches 166, 168 start cycling in response to the effect of the anticipator heaters 176 and 177 thereby to slow down the rate of temperature increase in the oven.

Figure 8:
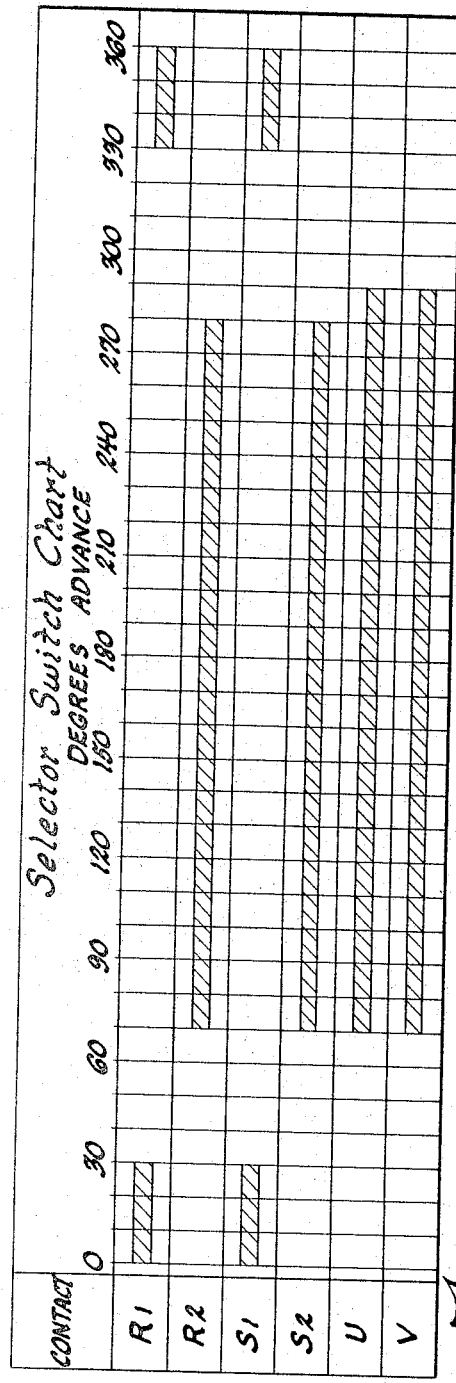
FIGURE 8 is a selector switch chart illustrating the positioning of internal switches in a selector switch assembly used with the control arrangement of this invention.

The pulser 210 is now approaching or reaching 100% closed time since the cycling of thermal switches 166, 168 is barely providing sufficient power to cause the pulser to open. Specifically, then, during the second control sequence, the broil unit 90 is cycled on 800 watts and the bake unit 94 is cycled on 3000 watts. Once the heat cleaning control temperature of 880° F. is arrived at, the thermal relay switches 166, 168 will cycle in response to the sensor 158 and cycler switch 160 to maintain this temperature. Throughout both the first and second control sequences of the temperature build up in the oven, the total heat energy supplied will average 112 B.t.u. per minute. In addition to the heat supplied in the oven, note that throughout both the CLEAN operation and the COOK operation the catalyst heater 112 supplies 175 watts of heat energy to activate the catalyst screen. For a more detailed disclosure of the open and closed condition of the selector switch assembly contacts $R_1$, $R_2$, $S_1$, $S_2$, U and V, reference may be had to the selector switch chart in FIGURE 8.

Temperatures in the CLEAN operation are considerably above those used during a COOK operation. For this reason a number of safety devices are incorporated in the control arrangement of this invention.

Since the degradation of accumulated oven soil is accomplished by the evolution of considerable smoke, the operation of the catalyst 114 must be assured before the oven is conditioned for high temperatures. In this regard (FIGURE 9), a relay 216 includes a solenoid coil 218 in series with the catalyst heater 112 and a switch 220 in series with the primary 152 of the transformer. Thus, the low voltage circuit 156 cannot be energized for producing high temperatures until the catalyst heater 112 and solenoid coil 218 are energized.

Before the initiation of an oven cleaning cycle, the oven door 56 is latched closed and the latch mechanism itself is locked in an immobilized condition—the latch mechanism interlock. For freeing and locking the latching mechanism, the high voltage circuit 150 includes a latch solenoid 222 in series with a latch solenoid switch 224 and the door switch 102. In general, the switch 224 is actuated by the movement of the door latch handle 226. More particularly, the switch 224 is closed after the first 10° of latch arm rotation to free the latch mechanism, remains closed during the next 80° of latch arm rotation while the door is being latched, and opens at the beginning of the last 10° of latch arm rotation to relock the latch mechanism. The latch mechanism for accomplishing this will be described more fully hereinafter.

Once the oven door is locked shut, it is desirable that the oven door not be openable until the temperatures within the oven return to a safe level. For this purpose a thermally responsive switch 230 is included in series with the lock solenoid—the switch 230 having an open position at all temperatures over 500° F. to prevent the door from being unlatched as will be understood more fully hereinafter. During the period of high temperature in the oven, a neon lock lamp 228, energized during CLEAN through a bleeder resistor 229, gives a visible indication that the oven door is locked shut and cannot be opened.

Also in view of the high temperatures available within the oven liner 50 during a CLEAN operation, it is desirable that the blower 76 be energized to cool the sidewalls of the range. To assure that the blower is in operation before a cleaning cycle can be commenced, a fan safety thermostat 234, responsive to heated air in the blower plenum, is included in series with the timer motor switch 188. When the blower or fan 76 is operating, the switch 234 will be closed and when the fan is not operating, the switch will be opened to prevent energization of the primary coil 152 of the transformer which energizes the low voltage circuit. Unless the transformer is energized, the temperature sensing system is inoperative to provide a supply of heat to the oven.

As set forth hereinabove, the oven door is latched by throwing the latch arm 226 to a door latched condition. The mechanism for accomplishing this will now be described with reference to FIGURES 4, 5 and 6. Carried on a C-shaped support member 238, a latch bolt actuator assembly or latch mechanism 240, in addition to the latch arm 226, includes an elongated latch bolt 242, a latch bolt actuator arm 244 pivotally connected to the latch bolt, and a latch arm lock and cam plate 246 pivotable about fixed pins 268 and 276 on the top 277 and bottom 279, respectively, of the support member. For transmitting latch arm movement to the latch bolt, a pin 248 carried by the lock and cam plate and movable therewith is relatively movably actuatingly connected to the latch bolt actuator arm 244. The lock and cam plate 246 has a lower lock plate portion 247 connected to the bolt actuator arm 244, a connector portion 250 which extends upwardly through an arcuate slot 281 in the top 277 of the support and a folded over cam plate portion 252 positioned beneath the actuator 225 of the lock solenoid switch 224. The latch arm 226 is affixed to the cam plate portion 252 of the lock and cam plate 246 such that both the lock plate portion 247 and the cam plate portion 252 rotate as a unit when the latch arm 226 is moved. Specifically, the actuator 225 of the lock solenoid switch 224 rests in a notch 254 when the latch arm is in its door unlatched position (FIGURES 5 and 6) and rests in a similar notch 256 after the latch arm has been moved to its door latched position. Between the notches 254 and 256, the switch actuator 225 is cammed upwardly to close the lock solenoid switch, thereby to energize the lock solenoid 222 and release the door latching mechanism for movement—the latch voltage interlock described more fully hereinafter.

At the front of the range (FIGURE 5), the latch bolt 242 projects from the front wall 28 of the range casing and, when the door is closed, extends through a hole in the latch bolt keeper plate 260 on the inner door panel of the door 56. The bolt includes a notch 262 which cooperates with a flange 263 on a pivotable lockout arm 264 when the door 56 is open, thereby to mechanically immobilize the latch bolt so that the latch arm 226 cannot be thrown when the door is open. The lockout member 264 is biased by a spring 280 into a position wherein the finger 270 thereof extends out of the range casing into the path of the oven door 56. In FIGURE 5, the various positions of the latch arm bolt are shown as they would occur as the latch arm 226 is moved from the solid line A position (door unlatched) to a phantom line C position (door latched). As the latch arm is pivoted about the pins 268 and 276, the latch bolt actuator arm moves first to the phantom line position B and the latch bolt is moved forwardly of the range wall 28 into the door 56, assuming, of course, that the lockout member 264 has been cammed out of interference with the bolt notch 262 by the finger portion 270 engaging the latch bolt keeper plate 260. Continued pivoting action of the latch arm 226 in the counterclockwise direction, as viewed in FIGURE 5, will position the latch bolt actuator arm and the bolt to the phantom line position C—the camming action of a pair of slots 272, 274 in the latch bolt actuator arm (FIGURE 6) with the fixed pivot pin 276 and the connecting pin 248 serving to draw the door 56 tightly against the oven seal 60.

In addition to mechanically preventing the actuation or the movement of the latch bolt 242 by the latch arm 226 when the oven door 56 is open, the control arrangement of this invention provides the aforementioned latch voltage interlock arrangement with the latch mechanism or actuator assembly 240 wherein the lock and cam plate 246 is immobilized by a latch lock pin 284 on a solenoid actuated lock plate 282 whenever the range 20 is not connected to a source of power. The pin 284 cooperates with a slot 288 in the lock plate portion 247 of the latch mechanism when the latch arm is in the unlatched position and with a hole 290 in the lock plate portion when the latch arm is in its latched position. In both instances the door latch arm 226 is immobilized whenever the solenoid 222 is deenergized to drop the pin 284 in slot 288 or hole 290—a spring 292 serving to return the interlock plate 282 to its lower position (solid line, FIGURE 4). With the solenoid 222 energized, the pin 284 is lifted out of either the slot 288 or hole 290 (phantom line, FIGURE 4) and the latch arm 226 is freed for movement. In this regard note that the slot 288 and hole 290 are larger than the latch lock pin 284 to provide rather a sloppy interlock fit. This permits the latch arm 226 to move the initial 10° in either its latched or unlatched positions needed to cam the solenoid switch 224 closed and energize the solenoid for lifting the pin out of either the slot or hole.

The solenoid actuated lock plate 282 and the latch mechanism 240 also include portions for mechanically preventing the conditioning of the range for a high temperature CLEAN operation until the oven door 56 is latched closed—the clean timer interlock.

The clean timer interlock, in its first phase, includes a mechanical interference portion to prevent one from reaching behind the latch arm grip 310 to turn the clean timer knob 302 before and during the time that the latch arm 226 is being pivoted the initial 10° to close the latch solenoid switch 224. With reference to FIGURES 1, 2, 3 and 5, the grip portion 310 of the latch arm includes a slot or pocket 311 which receives and closely overfits the clean timer knob 302 or a portion thereof when the latch arm is in its unlatched or COOK position. The clean timer knob is thus mechanically immobilized until the latch arm grip moves away from it. But note that as soon as the latch arm has pivoted 10° and before the latch arm grip interference has been removed from the clean timer knob 302, the solenoid switch 224 is closed by the pivoting of the latch arm to initiate the second phase of the clean timer interlock.

In the second phase of the clean timer interlock the solenoid actuated timer lock pin 286 takes over to mechanically interlock the clean timer before the latch arm grip releases the clean timer knob. More particularly, with the solenoid 222 energized, the pin 286 indexes with a notch 304 in the timer start mechanism or clean timer knob means 301 is prevent the clean timer knob 302 from being rotated to start the timer 184 until the door is locked closed and the door latch is immobilized in the door latched CLEAN position—latch lock pin 284 in hole 290 of the latch actuated lock plate portion 247.

The interlock portions of the safety system of this invention will best be understood with a description of an operating cycle for the self-cleaning oven 50, reference being had to the schematic representation of FIGURE 3 and the structural illustration of FIGURES 4 and 5. The control means, referred to generally as 300 in FIGURE 3, includes the selector switch assembly 200, the clean timer assembly 184, the user settable control or clean timer knob means 301 connected as by a gear train 303 in a manner to interconnect the actuation of the switches in the clean timer 184 and the selector switch 200 whenever the clean timer knob 302 is rotated. Note that the clean timer knob is not free to rotate at all times. For instance, knob rotation is prevented during the movement of the latch arm 226 from its unlatched position during the first 10° of latch arm movement by the slot 311 which overfits the clean timer knob 302 and then during the next 80° of latch arm movement by the solenoid actuated clean timer lock pin 286 which inserts in the notch 304 of the clean timer knob means 301.

Assuming now that it is desired to initiate an oven cleaning cycle to remove the accumulated soil from the oven 50, the user will close the oven door 56 to move the door switch 102 in series with the lock solenoid 222 (FIGURE 9)—an action which will remove the lockout member flange 263 from the latch bolt 242 to free the latch arm 226 for movement in the latching direction (position A to position C in FIGURE 5). In view of the sloppy fit of the latch lock pin 284 in oversized latch mechanism slot 288, the latch arm 226 is limitedly pivotally movable, and after a 10° movement thereof, the lock solenoid switch 224 is closed to energize the lock solenoid 222. This lifts the lock pin 284 out of the latch lock hole 288 so that the latch arm 226 may be pivoted an additional 80° about its fixed center, such as the pin 268, until the latch lock hole 290 is shifted in line with the lock pin 284 and the latch handle is approximately in the door latched CLEAN position shown schematically in FIGURE 3. At this point, the switch 224 opens (switch actuator 225 drops into the notch 256, FIGURE 4) and the solenoid 222 is deenergized, thereby dropping the timer lock pin 286 out of the timer lock notch 304 and dropping the latch lock pin 284 into the oversized latch lock hole 290—the resultant sloppy fit of pin 284 in hole 290 allowing an additional 10° of latch arm travel.

Note also that the grip portion 310 of the latch arm serves as a concealing or covering means overlying the clean timer knob 302 when the latch arm is in the oven door unlatched COOK position of FIGURES 2 and 5. Thus, there is not only the mechanical interlocks with the control means 300, i.e. the solenoid actuated timer lock pin 286 and the latch arm grip slot 311, but also a visual interlock in that the clean timer knob 302 is concealed from the user's view by the grip portion 310 of the latch arm.

Once the latch arm 226 is in the position of FIGURE 3, the oven door is locked and the clean timer knob 302 may be manually rotated 90° from the COOK position to the CLEAN position. The interconnection of the gear train 303 effects the following operations as the clean timer knob is rotated. First and with reference to FIGURE 9, R and S transfer from the $R_1$ and $S_1$ position, respectively, to the $R_2$ and $S_2$ position thereby connecting the bake heating element for electrical energy through a pulser 210 and connecting the broil heating element 90 for energization on a 118-volt power supply, $L_2$, N. Switches 179 and 181 are closed by the manual rotation of the clean timer knob, respectively, on contacts U and V to set up the high temperature circuit and to shunt out the cooking operation thermostat 128. Clean timer motor switch 188, closed manually on clean timer contact 2, energizes the clean timer 184 for automatic termination of the oven cleaning operation. In response to timer knob rotation, timer switch 190 moves from cooking operation contact 4 to cleaning operation contact 3 to shunt out the cooking operation timer 120 (switch 128) and the oven thermostat 128 (switch W), and clean timer switch 192 moves from cooking operation contact 6 to cleaning operation contact 5 to start the cooling air blower 76. After this set up procedure, the clean timer motor 186 will advance the cleaning operation for about a two-hour period (between 116 minutes and 128 minutes depending on how close the timer knob is turned to the 90° CLEAN position). As will be apparent from FIGURES 7 and 9, heat may be supplied for cleaning only so long as contact 3 is closed. As soon as the timer actuates switch 190 to open contact 3, the primary 152 of the transformer is deenergized along with the low voltage circuit 156. Four minutes later, the timer switch 188 opens the contact 2 to terminate the operation of the clean timer 184. To illustrate the interconnection of the selector switch assembly 200 with the clean timer 184, FIGURES 7 and 8 have been coordinated so that the 60 incremental advances of the timer (FIGURE 7) start and stop coincidentally with the 0°–360° rotation of the selector switch (FIGURE 6).

So long as the temperatures within the oven chamber are above 500° F., the safety thermostat 230 will remain open to prevent the unlatching of the oven door and the lock light 228 will remain illuminated to indicate high temperatures in the oven. After the lock light 228 goes out, indicating a closing of the thermostat 230, the user is instructed to turn the clean timer knob 302 from the timer STOP position to the COOK position. This manual knob operation will cause transfer switches R and S to move from the cleaning operation contracts $R_2$ and $S_2$, respectively, to the cooking operation contacts $R_1$ and $S_1$ to reestablish cooking heat supply rates; will cause switches 179 and 181 to open contacts U and V, respectively, to reestablish cooking thermostat control; and will cause timer switch 192 to move from the cleaning operation contact 5 to the cooking operation contact 6 to condition the latch solenoid circuit for energization so that the oven door can be unlatched when oven temperatures permit. As soon as the latch arm 226 is returned to its unlatched position covering and interlocking with the clean timer knob 302, the range 20 is in condition for cooking operations.

While the embodiment of the present invention as herein disclosed constitutes a preferred form, it is to be understood that other forms might be adopted.

What is claimed is as follows:

1. A self-cleaning oven comprising walls defining a bake and broil compartment, one of said walls being an openable door, latch means in fixed relation to said compartment and selectively connectable with said door and having a "cook" position for permitting the opening of said door and a "clean" position for locking said door closed, heating means for said compartment for establishing bake and broil cooking operations, control means for said heating means settable in a "cook" position to control the heating means to effect a cooking operation including a bake operation and a broil operation and user settable in a "clean" position to control the heating means to effect an oven cleaning operation, first temperature control means for said heating means to control the heating means when in a cooking operation and user settable to a variable temperature position to hold selected baking temperatures within a baking temperature range and being user settable to a "broil" position to control the heating means to supply heat energy during said broil operation, and cleaning means for said walls for degrading food and grease deposits thereon, said cleaning means including, (a) lockout means operated by said latch means and mechanically lockingly connected with said control means when said control means and said latch means are in their respective "cook" positions to immobilize said control means and prevent said control means from being set in said "clean" position until after said latch means is in its "clean" position, (b) second temperature control means factory presettable to permit a temperature rise in said oven to a predeterminal level generally above 800° F., (c) said control means settable in its "clean" position after said latch means is in its "clean" position to shunt said first temperature control means with said second temperature control means to control said heating means to supply heat energy to said compartment to effect said cleaning operation, (d) and timing means initiated by the setting of said control means in its "clean" position and drivably connected to at least a portion of said control means to terminate said cleaning operation by operating said at least a portion of said control means from its "clean" position to another position.

2. The oven of claim 1 wherein said control means includes a clean timer knob having "clean," "stop," and "cook" positions, and said knob being user settable to said "clean," and "cook" positions, and said knob being automatically, timingly operated to said "stop" position by said timing means.

3. The oven of claim 1 wherein said control means includes a user settable knob and said latch means includes a latch arm concealing said knob in the "cook" position of said latch means and exposing said knob in the "clean" position of said latch means.

4. The oven of claim 3 wherein said knob and said latch arm are on a control panel above the oven at the rear thereof.

5. The oven of claim 1 including a power supply pulsing means in power supply relationship to a portion of said heating means when said control means is in its "clean" position.

6. The oven of claim 1 wherein said control means includes selector switch means, timer switch means and user settable knob means mechanically interconnected for simultaneous movement together in response to manual operation of said user settable knob means, said user settable knob means having a notch means, and said lockout means having a dog means engageable in said notch means when said control means and said latch means are in their respective "cook" positions.

7. The oven of claim 1 including a second timing means having a timed switch means in power supply relationship to said control means when said control means is in its "cook" position and said first temperature control means is in its variable temperature position for determining the duration of said bake cooking operation.

8. An oven comprising walls defining a bake and broil compartment, heating means for said compartment for establishing bake and broil cooking operations, control means for said heating means selectably user settable in a first position to control the heating means to effect a "cook" operation including a bake operation and a broil operation and user settable in a second position to control the heating means to effect a "clean" operation, first temperature control means for said heating means to control the heating means when in a "cook" operation and user settable in a first manner to hold selected baking temperatures within a baking temperature range and being user settable in a second manner to control the heating means to supply heat energy during said broil operation, and cleaning means for said walls for degrading food and grease deposits thereon, said cleaning means including said control means settable in said second position to control said heating means to supply heat energy to said compartment to effect said "clean" operation and including a second temperature control means factory presettable to permit a temperature rise in said oven to a predetermined level generally above 800° F. and timing means drivably connected to at least a portion of said control means and operable to terminate said "clean" operation by operating said at least a portion of said control means from said second position to another position, said control means in said second position shunting said first temperature control means with said second temperature control means and initiating the operation of said timing means.

9. An oven comprising walls defining a bake and broil compartment, heating means for said compartment for establishing bake and broil cooking operations, control means for said heating means selectably user settable in a first position to control the heating means to effect a "cook" operation including a bake operation and a broil operation and user settable in a second position to control the heating means to effect a "clean" operation, first temperature control means for said heating means to control the heating means when in a "cook" operation and user settable in a first manner to hold selected baking temperatures within a baking temperature range and being user settable in a second manner to control the heating means to supply heat energy during said broil operation, first timing means connected to at least a portion of said control means and closable to control said heating means to supply heat energy to said compartment to initiate said bake operation and automatically openable to terminate the supply of heat energy to said compartment to terminate said bake operation, and cleaning means for said walls for degrading food and grease deposits thereon, said cleaning means including said control means settable in said second position to control said heating means to supply heat energy to said compartment to effect said "clean" operation and including a second temperature control means factory presettable to permit a temperature rise in said oven to a predetermined level of approximately 880° F. and second timing means drivably connected to at least another portion of said control means and operable to terminate said "clean" operation by operating said at least another portion of said control means from said second position to another position, said control means in said second position shunting said first temperature control means with said second temperature control means and initiating the operation of said second timing means.

10. A self-cleaning oven comprising walls defining a cooking compartment, one of said walls being an openable door, latch means in fixed relation to said compartment and selectively connectable with said door and having a "cook" position for permitting the opening of said door and a "clean" position for locking said door closed, heating means for said compartment for establishing cooking operations, control means for said heating means settable in a "cook" position to control the heating means to effect a cooking operation and user settable in a "clean" position to control the heating means to effect an oven cleaning operation, first temperature control means for said heating means to control the heating means when in a cooking operation and user settable to a variable temperature position to hold selected temperatures within a cooking operation temperature range, and cleaning means for said walls for degrading food and grease deposits thereon, said cleaning means including, (a) lockout means operated by said latch means and mechanically lockingly connected with said control means when said control means and said latch means are in their respective "cook" positions to immobilize said control means and prevent said control means from being set in said "clean" position until after said latch means is in its "clean" position, (b) second temperature control means presettable to permit a temperature rise in said oven to a predetermined level generally above 800° F.
(c) said control means settable in its "clean" position after said latch means is in its "clean" position to shunt said first temperature control means with said second temperature control means to control said heating means to supply heat energy to said compartment to effect said cleaning operation,
(d) and timing means initiated by the setting of said control means in its "clean" position and drivably connected to at least a portion of said control means to terminate said cleaning operation by operating said at least a portion of said control means from its "clean" position to another position,
(e) said lockout means including stop means actuatable for selectively engaging either said control means or said latch means, means for actuating said stop means, and switch means closable for energizing said actuating means and openable for deenergizing said actuating means.
(f) said latch means including cam means in operating relation to said switch means and having a first position wherein said switch means is open when said latch means is in said "cook" position, a second position wherein said switch means is open when said latch means is in said "clean" position and a third position between said first and second positions wherein said switch means is closed,
(g) the engagement of said stop means with said control means and said latch means having sufficient play to allow said cam means to move to said third position to close said switch means when said latch means is in either said "cook" or "clean" positions.

11. The oven of claim 1 including blower means operable whenever said control means is set in said "clean" position for blowing air on said walls for cooling thereof, and means thermally responsive to the air being blown and in series with said at least a portion of said control means to terminate said cleaning operation irrespective of the "clean" or said another positions of said portion.

12. A self-cleaning oven comprising walls defining a cooking compartment, one of said walls being an openable door, latch means in fixed relation to said compartment and selectively connectable with said door and having a "cook" position for permitting the opening of said door and a "clean" position for locking said door closed, heating means for said compartment for establishing cooking operations, control means for said heating means settable in a "cook" position to control the heating means to effect a cooking operation and user settable in a "clean" position to control the heating means to effect an oven cleaning operation, first temperature control means for said heating means to control the heating means when in a cooking operation and user settable to a variable temperature position to hold selected temperatures within a cooking operation temperature range, and cleaning means for said walls for degrading food and grease deposits thereon, said cleaning means including,
(a) lockout means operated by said latch means and mechanically lockingly connected with said control means when said control means and said latch means are in their respective "cook" positions to immobilize said control means and prevent said control means from being set in said "clean" position until after said latch means is in its "clean" position,
(b) second temperature control means presettable to permit a temperature rise in said oven to a predetermined level generally above 800° F.,
(c) said control means settable in its "clean" position after said latch means is in its "clean" position to shunt said first temperature control means with said second temperautre control means to control said heating means to supply heat energy to said compartment to effect said cleaning operation,
(d) and timing means initiated by the setting of said control means in its "clean" position and drivably connected to at least a portion of said control means to terminate said cleaning operation by operating said at least a portion of said control means from its "clean" position to another position.

13. The oven of claim 12 wherein said control means includes a user settable timer actuator and said lockout means includes a portion of said latch means concealingly and interlockingly engaging with said timer actuator in the "cook" position of said latch means and exposingly and releasingly disengaging with said timer actuator in the "clean" position of said latch means.

14. The oven of claim 12 wherein said control means includes a user settable timer actuator and said lockout means includes a portion of said latch means interlockingly engaging with said timer actuator in the "cook" position of said latch means and releasingly disengaging with said timer actuator in the "clean" position of said latch means.

15. The oven of claim 12 wherein said control means includes selector switch means, timer switch means and user settable knob means mechanically interconnected for simultaneous movement together in response to manual operation of said user settable knob means, said user settable knob means having a user settable knob and a notch, and said lockout means having means engageable with said notch and said knob when said control means and said latch means are in their respective "cook" positions.

16. The oven of claim 12 wherein said first temperature control means is removed from any controlling relationship with the heating means when shunted with said second temperature control means.

17. A self-cleaning oven comprising walls defining a cooking compartment, one of said walls being an openable door, latch means between said compartment and said door having a "cook" position for permitting the opening of said door and a "clean" position for locking said door closed, heating means for said compartment for establishing cooking operations, control means for said heating means settable in a "cook" position to control the heating means to effect a cooking operation and user settable in a "clean" position to control the heating means to effect an oven cleaning operation, first temperature control means for said heating means to control the heating means when in a cooking operation and user settable to a variable temperature position to hold selected temperature within a cooking operation temperature range, and cleaning means for said walls for degrading food and grease deposits thereon, said cleaning means including,
(a) lockout means operated by said latch means and interlockingly associated with said control means when said control means and said latch means are in their respective "cook" positions to prevent said control means from being set in said "clean" position until after said latch means is in its "clean" position,
(b) second temperature control means presettable to permit the temperature to rise in said oven to a predetermined level generally above 800° F.,
(c) said control means settable in its "clean" position after said latch means is in its "clean" position to negate the effectiveness of said first temperature control means and establish the effectiveness of said second temperature control means to control said heating means to supply heat energy to said compartment to effect said cleaning operation,
(d) and timing means initiated by the setting of said control means in its "clean" position and drivably connected to at least a portion of said control means to terminate said cleaning operation by operating said at least a portion of said control means from its "clean" position to another position.

18. A self-cleaning oven comprising walls defining a cooking compartment, heating means for said compartment for establishing cooking operations, control means for said heating means settable in a "cook" position to control the heating means to effect a cooking operation and settable in a "clean" position to control the heating means to effect an oven cleaning operation, said control means including (a) first temperature control means for said heating means to control the heating means when in a cooking operation and settable to hold selected temperatures within a cooking operation temperature range, (b) and second temperature control means for said heating means to control the heating means independently of said first temperature control means when in a cleaning operation and settable in a manner to negate the effectiveness of said first temperature control means and establish the effectiveness of said second temperature control means to permit the temperature to rise in said oven to a predetermined level generally above 800° F., whereby food and grease deposits on said walls are degraded.

19. The self-cleaning oven of claim 18 wherein said first temperature control means includes a user settable thermostat means and a cooking temperature control rheostat operated thereby, and said second temperature control means includes a factory settable cleaning temperature control rheostat in electrically parallel relationship with said cooking temperature control rheostat and switch means settable independently of said user settable thermostat means and having one portion for disconnecting said cooking temperature control rheostat from controlling relationship with said heating means and another portion operable simultaneously with said one portion for connecting said cleaning temperature control rheostat for controlling relationship with said heating means.

20. A self-cleaning oven comprising walls defining a cooking compartment, heating means for said compartment for establishing cooking operations, control means for said heating means settable in a "cook" position to control the heating means to effect a cooking operation and settable in a "clean" position to control the heating means to effect an oven cleaning operation, said control means including (a) sensor means for sensing a temperature in said compartment, (b) first temperature control means for said heating means operatively connected with said sensor means to control the heating means when in a cooking operation and settable to hold selected temperatures within a cooking operation temperature range, (c) and second temperature control means for said heating means operatively connected with said sensor means to control the heating means independently of said first temperature control means when in a cleaning operation and settable in a manner to negate the effectiveness of said first temperature control means by operatively disconnecting said first temperature control means from said sensor means and establishing the effectiveness of said second temperature control means to permit the temperature to rise in said oven to a predetermined level generally above 800° F., whereby food and grease deposits on said walls are degraded.

References Cited

UNITED STATES PATENTS

| | | | |
|---|---|---|---|
| 3,094,605 | 6/1963 | Welch | 219—396 X |
| 3,122,626 | 2/1964 | Welch | 219—295 |
| 3,214,567 | 10/1965 | Chiskolm | 219—396 X |
| 3,270,183 | 8/1966 | Jordan | 219—398 |

RICHARD M. WOOD, *Primary Examiner.*

C. L. ALBRITTON, *Assistant Examiner.*